United States Patent
Le et al.

(10) Patent No.: US 7,395,414 B2
(45) Date of Patent: Jul. 1, 2008

(54) DYNAMIC RECALCULATION OF RESOURCE VECTOR AT ISSUE QUEUE FOR STEERING OF DEPENDENT INSTRUCTIONS

(75) Inventors: Hung Q. Le, Austin, TX (US); Dung Q. Nguyen, Austin, TX (US); Brian W. Thompto, Austin, TX (US); Raymond C. Yeung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 11/056,691

(22) Filed: Feb. 11, 2005

(65) Prior Publication Data
US 2006/0184767 A1    Aug. 17, 2006

(51) Int. Cl.
G06F 9/38    (2006.01)
(52) U.S. Cl. .............. 712/216; 712/213; 712/215; 712/222
(58) Field of Classification Search ............ 712/24, 712/213, 215, 216, 222
See application file for complete search history.

(56) References Cited

U.S. PATENT DOCUMENTS

| | | | | |
|---|---|---|---|---|
| 5,337,415 | A | * | 8/1994 | DeLano et al. ............... 712/213 |
| 5,828,895 | A | * | 10/1998 | Chan et al. ..................... 712/23 |
| 6,658,551 | B1 | * | 12/2003 | Berenbaum et al. ........... 712/24 |
| 6,665,791 | B1 | * | 12/2003 | Berenbaum et al. ........... 712/24 |
| 7,007,153 | B1 | * | 2/2006 | Berenbaum et al. ........... 712/24 |
| 7,096,343 | B1 | * | 8/2006 | Berenbaum et al. ........... 712/24 |

* cited by examiner

*Primary Examiner*—William M. Treat
(74) *Attorney, Agent, or Firm*—Diana Roberts-Gerhardt; Synnestvedt & Lechner LLP

(57) ABSTRACT

A method and apparatus for steering instructions dynamically, at issue time, so as to maximize the efficiency of use of execution units being shared by multiple threads being processed by an SMT processor. Resource vectors are used at issue time to redirect instructions, from threads being processed simultaneously, to shared resources for which the multiple threads are competing. The existing resource vectors for instructions that are queued for issuance are analyzed and, where appropriate, dynamically recalculated and modified for maximum efficiency.

6 Claims, 8 Drawing Sheets

DYNAMIC RECALCULATION OF RESOURCE VECTOR AT ISSUE QUEUE FOR STEERING OF DEPENDENT INSTRUCTIONS

BACKGROUND OF THE INVENTION

1. Field of the Invention

The present invention generally relates to computer systems, and more particularly to an improved method of steering program instructions to a specific execution unit in a processor, and to an improved processor design.

2. Description of the Related Art

High-performance computer systems use multiple processors to carry out the various program instructions embodied in computer programs such as software applications and operating systems. These processors typically have a processor core comprising a single integrated circuit superscalar microprocessor having various execution units (fixed-point units, floating-point units, and load/store units), registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

Simultaneous multithreading (SMT) is a processor design that combines hardware multithreading with superscalar processor technology to allow multiple threads to issue instructions each cycle. Unlike other hardware multithreaded architectures in which only a single hardware context (i.e., thread) is active on any given cycle, SMT permits all thread contexts to simultaneously compete for and share processor resources. To reduce issue latency between a dependent instruction and the independent instruction on which it depends (i.e., the instruction that is producing its data), it is desirable to be able to steer the dependent instruction to the same execution unit where the independent instruction is being executed. On a microprocessor with multiple execution units, it can be quite difficult to steer the dependent instruction to the same execution unit on which the independent instruction is being executed. This is because, with so many operations being performed in a short period of time, all of which may be competing for use of the same execution units, resource conflicts invariably occur.

To reduce the competition for the shared execution units and other shared resources between the threads, "steering" techniques have been developed to steer the various instructions in the threads to particular resources based on thread priority (e.g., a thread with a higher priority might be given preferential access to shared resources over a lower priority thread). In the prior art, these steering techniques were used as part of a queuing process prior to issue time, that is, the instructions were statically assigned an execution unit. Each execution unit was fed by its own issue queue, and once an instruction was placed into the issue queue of a particular execution unit, it would have to issue to that particular execution unit.

While these steering techniques of the prior art function adequately, they do not allow dynamic modification of the instruction destination, once the instruction is queued up for issuance. This can lead to problems because there my be certain downstream events occurring, i.e., problems with execution units, changed priorities, and the like, that affect the operation of the execution units and which, if known prior to issue time, might have changed the way in which the instructions were steered. Accordingly, it would be desirable to devise a method whereby instructions could be dynamically steered upon issuance.

SUMMARY OF THE INVENTION

The present invention is a method and apparatus for steering instructions dynamically, at issue time, so as to maximize the efficiency of use of execution units being shared by multiple threads being processed by an SMT processor. The present invention makes use of resource vectors at issue time to redirect instructions, from threads being processed simultaneously, to shared resources for which the multiple threads are competing.

The existing resource vectors for instructions that are queued for issuance are analyzed and, where appropriate, dynamically recalculated and modified for maximum efficiency. The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE PREFERRED EMBODIMENTS

Figure 1:
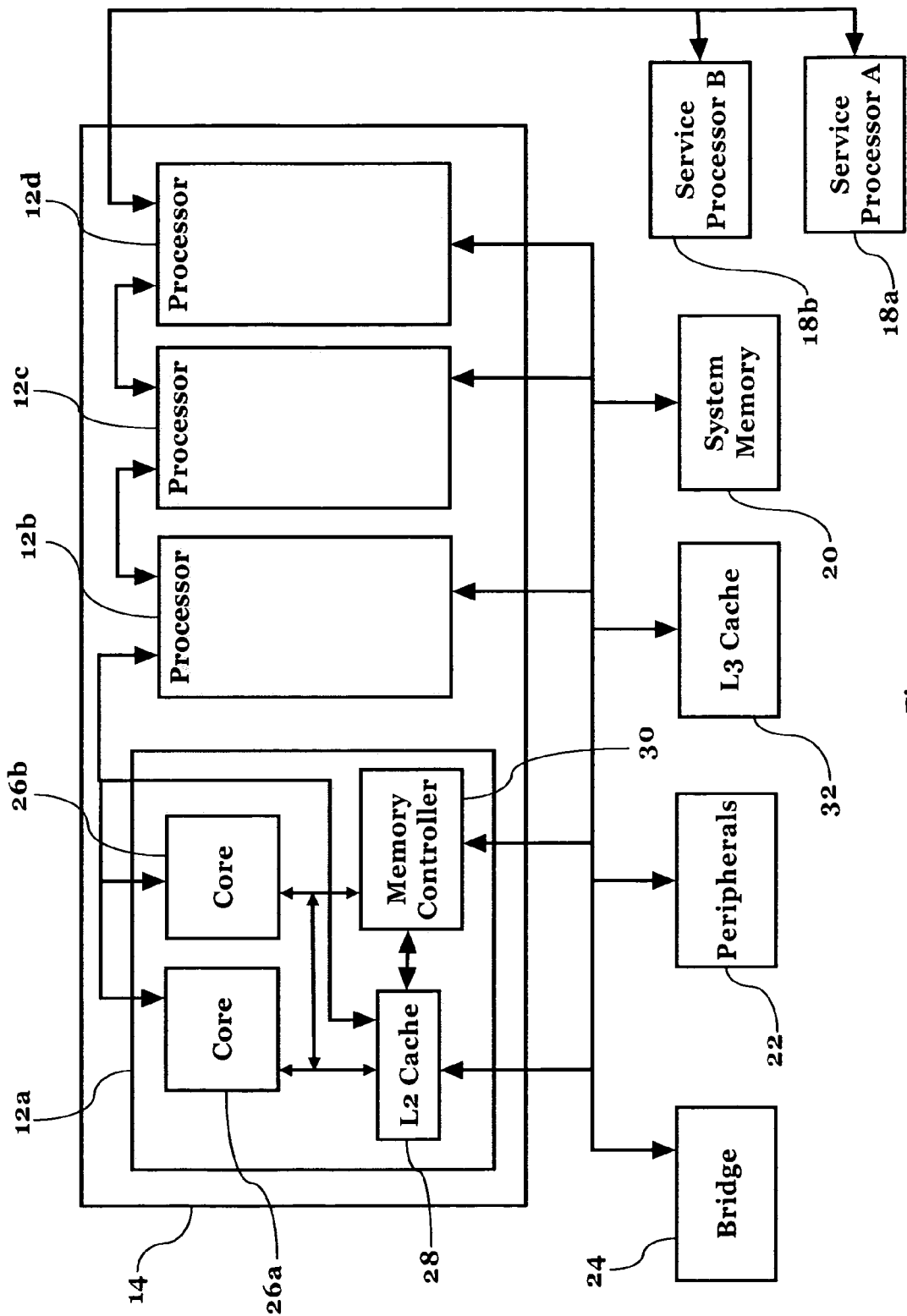
FIG. 1 is a typical prior art multi-processor system.

A typical prior art multi-processor system 10 is shown in FIG. 1. Computer system 10 has one or more processing units arranged in one or more processor groups; in the depicted system, there are four processing units 12a, 12b, 12c and 12d in processor group 14. The processing units communicate with other components of system 10 via a system or fabric bus 16. Fabric bus 16 is connected to a system memory 20, and various peripheral devices 22. Service processors 18a, 18b are connected to processing units 12 via a JTAG interface or other external service port. A processor bridge 24 can optionally be used to interconnect additional processor groups.

In a symmetric multi-processor (SMP) computer, all of the processing units 12a, 12b, 12c and 12d are generally identical, that is, they all use a common set or subset of instructions and protocols to operate, and generally have the same architecture. As shown with processing unit 12a, each processing unit may include one or more processor cores 26a, 26b which carry out program instructions in order to operate the computer. An exemplary processor core includes the Power5™ processor marketed by International Business Machines Corp., which comprises a single integrated circuit superscalar microprocessor having various execution units (fixed-point units, floating-point units, and load/store units), registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

Each processor core 26a, 26b may include an on-board (L1) cache (typically separate instruction cache and data caches) implemented using high speed memory devices. Caches are commonly used to temporarily store values that might be repeatedly accessed by a processor, in order to speed up processing by avoiding the longer step of loading the values from system memory 20. A processing unit can include another cache, i.e., a second level (L2) cache 28 which, along with a memory controller 30, supports both of the L1 caches that are respectively part of cores 26a and 26b. Additional cache levels may be provided, such as an L3 cache 32 which is accessible via fabric bus 16. Each cache level, from highest (L1) to lowest (L3) can successively store more information, but at a longer access penalty. For example, the on-board L1 caches in the processor cores might have a storage capacity of 128 kilobytes of memory, L2 cache 28 might have a storage capacity of 512 kilobytes, and L3 cache 32 might have a storage capacity of 2 megabytes. To facilitate repair/replacement of defective processing unit components, each processing unit 12a, 12b, 12c, 12d may be constructed in the form of a replaceable circuit board or similar field replaceable unit (FRU), which can be easily swapped installed in or swapped out of system 10 in a modular fashion.

Figure 2:
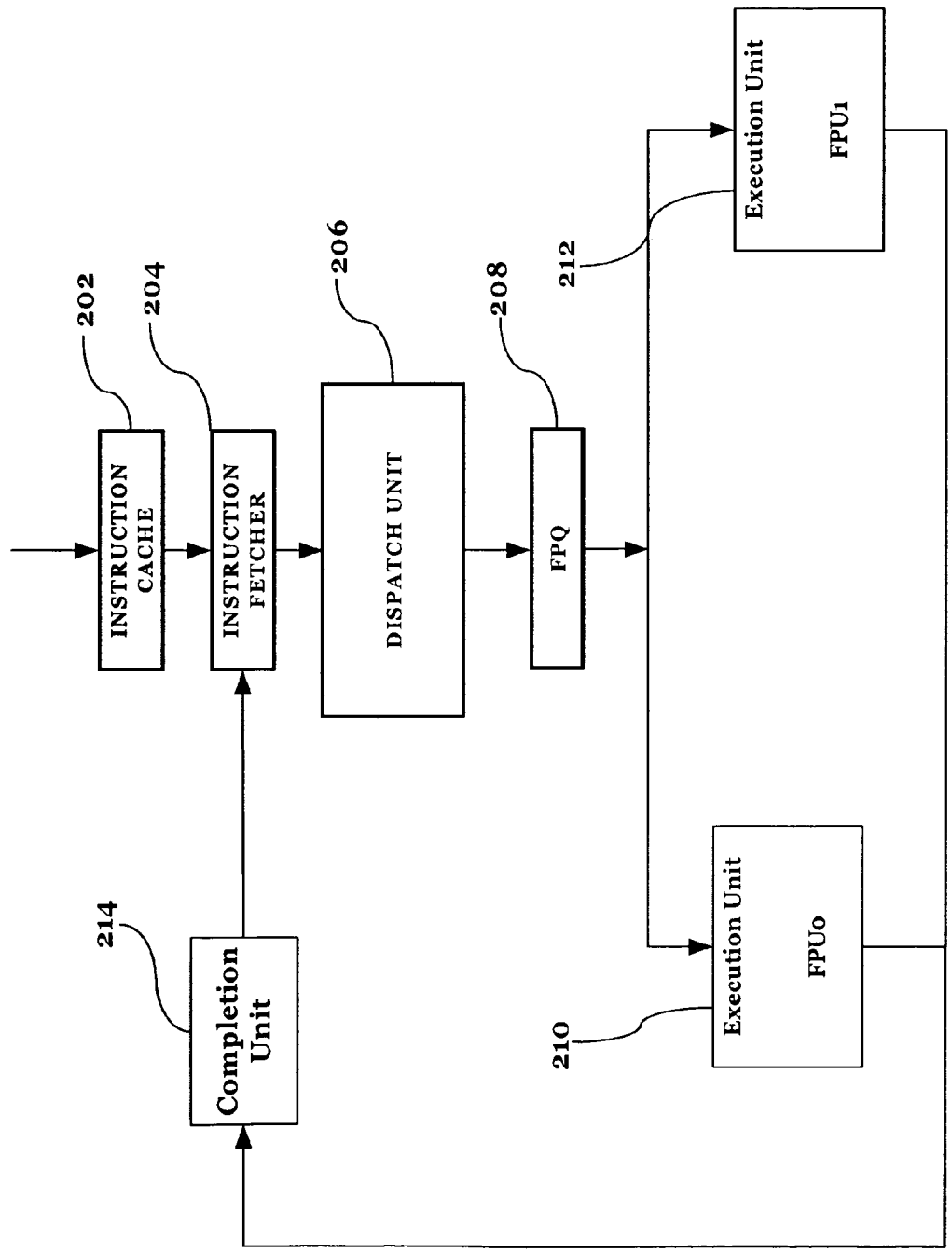
FIG. 2 depicts elements of a typical computer processor relevant to the present invention.

FIG. 2 depicts elements of a typical computer processor relevant to the present invention. Processor 200 is generally comprised of a single integrated circuit superscalar microprocessor, and includes various execution units, registers, buffers, memories, and other functional units (explained further below), which are all formed by integrated circuitry. Those skilled in the art will appreciate that the present invention is not limited to the specific construction shown in FIG. 2, as some components may be omitted, other components may be added, or different interconnections provided while still affording the novel functionality disclosed herein.

Instruction cache 202 is coupled to an instruction fetcher 204, which fetches instructions for execution from instruction cache 202 during each cycle. Instruction fetcher 204 transmits branch instructions fetched from instruction cache 202 to a branch processing unit (not shown) for calculating the next instruction fetch address. In accordance with the present invention, the instruction fetcher temporarily stores sequential instructions within floating point issue queue (FPQ) 208 for execution by other execution circuitry within processor 200. Details of FPQ 208 are described below. The execution circuitry of processor 200 has multiple execution units for executing sequential instructions, in this example, floating-point units (FPUs) 210 and 212. Execution units 210 and 212 execute one or more instructions of a particular type of sequential instructions during each processor cycle. For example, FPUs 210 and 212 perform single and double precision floating-point arithmetic and logical operations, such as floating-point multiplication and division, on source operands received from floating-point registers (FPRs) (not shown).

Processor 200 may employ both pipelining and out-of-order execution of instructions to further improve the performance of its superscalar architecture. Accordingly, instructions can be executed by FPUs 210 and 212 in any order as long as data dependencies are observed. Dispatch unit 206 decodes and dispatches one or more instructions to FPQ 208. FPQ 208 issues instructions to execution units 210 and 212. Upon dispatch, instructions are also stored within the multiple-slot completion buffer of completion unit 214 to await completion. Processor 200 tracks the program order of the dispatched instructions during out-of-order execution utilizing unique instruction identifiers.

Figure 2A:
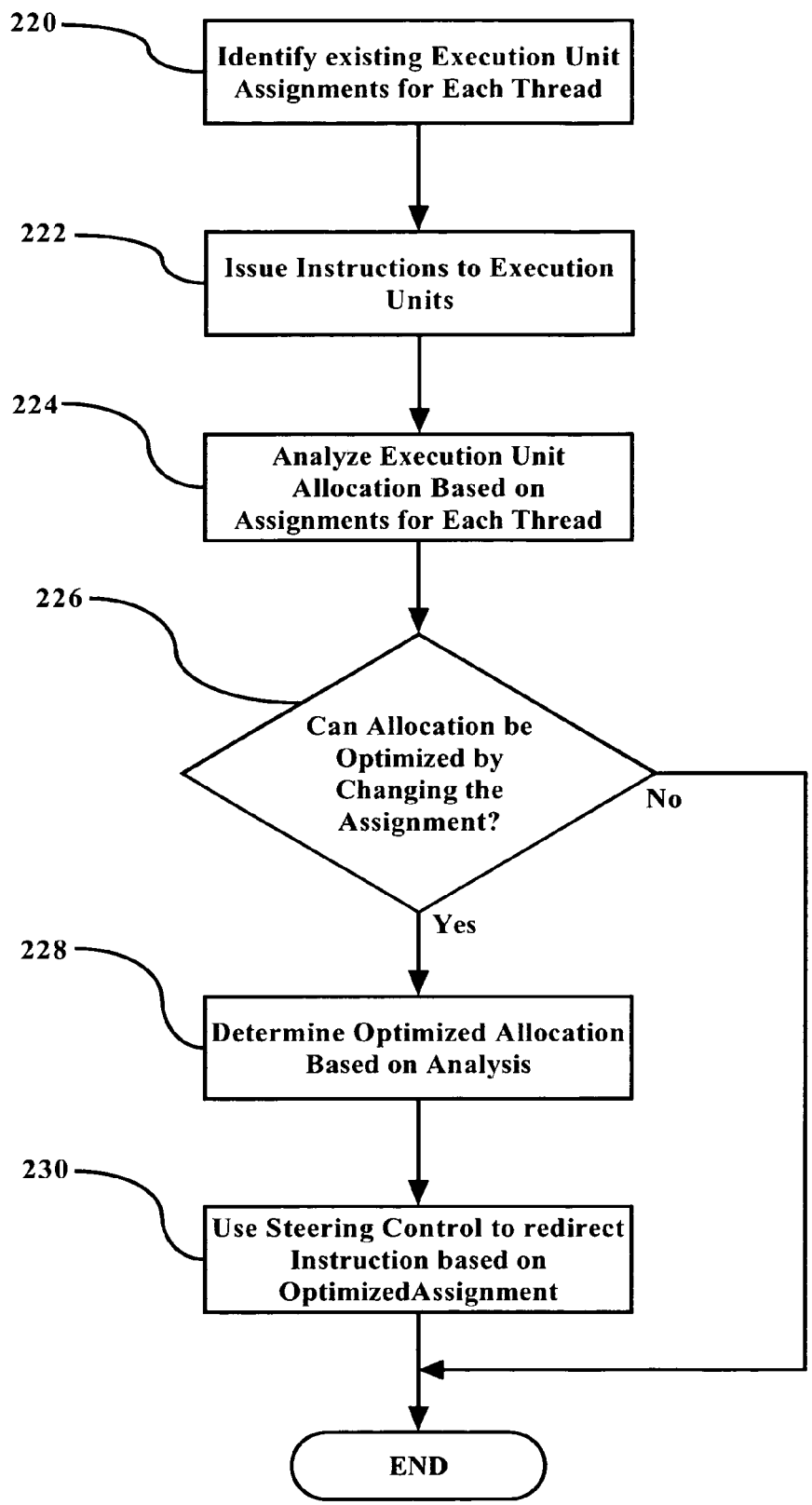
FIG. 2A is a flowchart illustrating the overall inventive concept of the present invention.

FIG. 2A is a flowchart illustrating the overall inventive concept of the present invention. Referring to FIG. 2A, at step 220, the existing execution unit assignments for each thread are identified. As is well known, prior art systems statically assign execution units to be used to process instructions; conflicts are typically resolved by designating one thread as a primary thread and another thread as a secondary thread, and giving the primary thread precedence for execution unit assignment.

At step 222, the instructions are issued to their assigned execution units. At step 224, the allocation of the execution units among the multiple threads is analyzed based on the existing execution unit assignments. At step 226, a determination is made as to whether or not the execution unit allocation can be optimized by changing the assignment. In other words, according to the present invention, the execution unit assignment for a thread is not the last word. The present invention allows reallocation of the assignments after the instructions are issued.

If, at step 226, it is determined that the allocation cannot be optimized by changing the assignment, then the process proceeds to the end and the instructions are processed as they are normally. However, if at step 226, it is determined that the allocation can be optimized by changing the assignment, then at step 228, the optimized allocation is determined based on the analysis, and at step 230, steering controls are used to redirect the instructions based upon the optimized assignment. As described in more detail below, in a preferred embodiment, the steering controls are simply a series of logic units, latches, and triggerable muxs which allow rerouting of instructions as desired. Thus, using the system of the present invention, dynamic allocation of assignments to execution units can be performed after issuance of the instructions. The steps of FIG. 2A are performed repeatedly with each cycle of the processor, moving instructions through the processor with each cycle.

Figure 3:
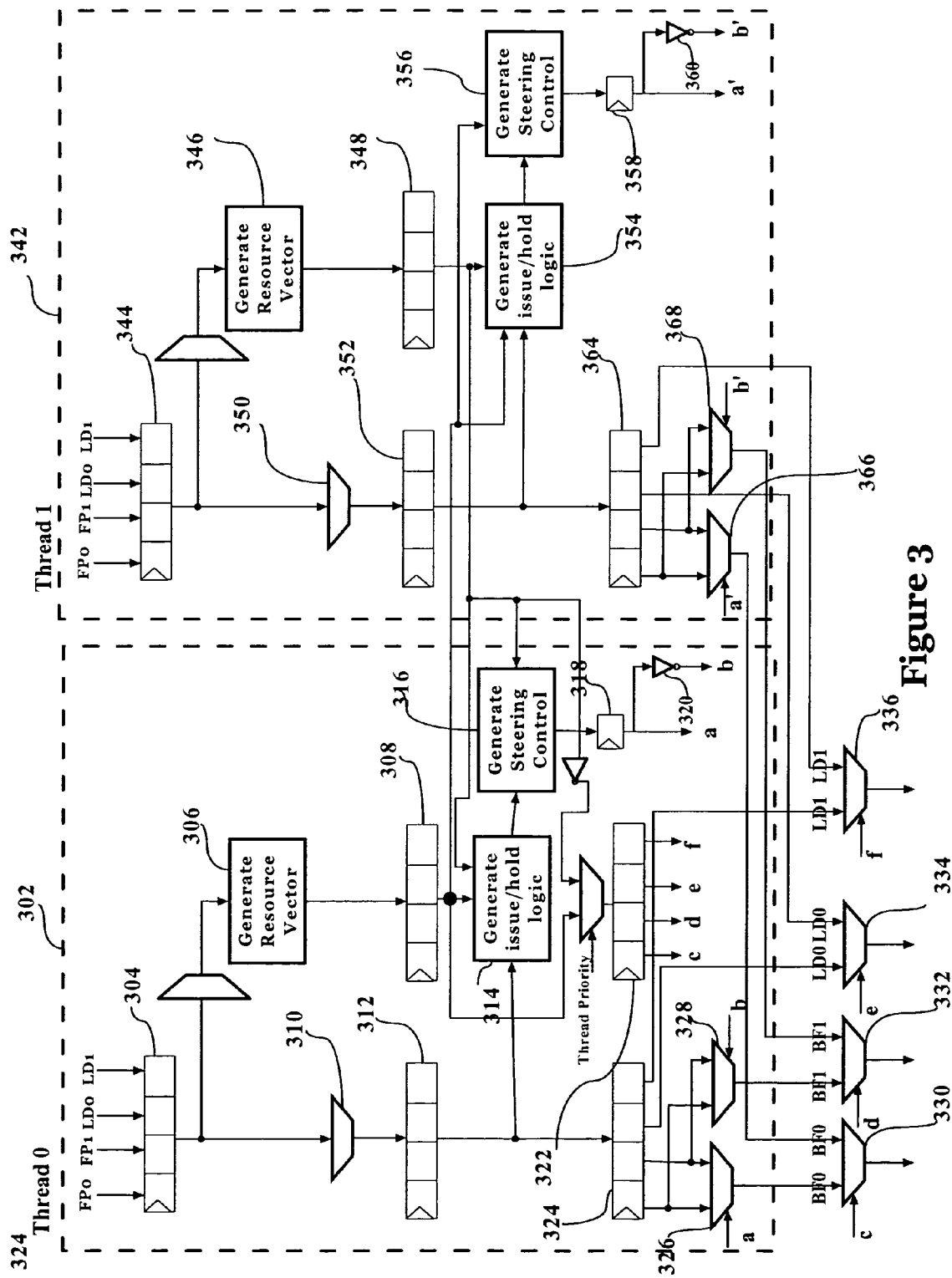
FIG. 3 is a block diagram illustrating the FPQ of the present invention.

FIG. 3 is a block diagram illustrating the FPQ 208 of the present invention. Referring to FIG. 3, the thread processing for Thread 0 is performed by thread processor 302, and the thread processing for Thread 1 is performed by thread processor 342. With the exception of the mux control signals c, d, e, and f, thread processor 302 and thread processor 342 are essentially identical.

Instructions FP0, FP1, LD0, and LD1 are input to latch 304. Instructions FP0, FP1, LD0, and LD1 are dispatched to the instruction queue from dispatch unit 206 of FIG. 2. FP0 is the older of the floating point instruction being dispatched. FP1 is the younger floating point instruction dispatched. LD0 is the older load instruction dispatched and LD1 is the younger load instruction dispatched. On the next cycle of the processor, latch 304 releases the currently-stored instruction set, which moves it along to resource vector generator 306, the operation of which is discussed in more detail below. Simultaneously, the instruction set also travels to mux 310. Mux 310 is simply a hold mux; if the instruction set entering the mux is not ready to issue, mux 310 will not let the instruction set move on to the next stage until it is ready to issue. For example, if a resource conflict exists with an instruction set preparing to issue from thread 1, mux 310 will hold the instructions until the resource conflict is resolved and resources are available to process the instruction set.

Resource vector generator 306 takes the instruction set from latch 304 and generates a resource vector which identifies the execution needs of each instruction in the instruction set. For example, if the instruction set contains a first floating-point instruction FP0, a second floating-point instruction FP1, a first load port instruction LD0, and a second load port instruction LD1, the resource vector generator will generate a vector indicating that this instruction set will require two FPUs to be processed and it will essentially "map" the instructions to the appropriate processor, so that when the instructions are ready to issue, it is known where to send them. In prior art systems, the issue queue was a merged queue with respect to threads. The instruction queue did not take into account thread priority when issuing. Priority was handled by dispatch.

The resource vectors generated by resource vector generator 306 are next moved into latch 308 where they are held until the next cycle. From there, in accordance with the present invention, they are passed on to three different locations. The first location is latch 322. A thread priority mux 315 receives outputs from both latch 308 and latch 352, and thread priority mux 315 will release one of the two instruction groups to latch 322 based on the thread priority. Second, the resource vector is applied to issue/hold logic generator 314. Finally, latch 308 also releases its contents to issue/hold logic generator 354 and steering control generator 356 in thread processor 342.

The purpose of selectively moving the contents of either latch 308 or latch 352 directly into latch 322 is so that, on the next clock cycle, the contents of latch 322 will provide control signals for mux 330, mux 332, mux 334, and mux 336. Since mux's 330, 332, 334, and 336 provide outputs directly to the execution units, respectively, these control signals are the controls that determine which instructions from which threads will be issued, as discussed in more detail below. Only Thread 0 has this logic because it can be determined whether or not Thread 0 has priority over a particular execution unit and whether or not it needs to use that unit. If Thread 0 does not have priority and the need to use a particular unit, then Thread 1 will be given the unit by default.

The resource vector is also input to issue/hold logic generator 314. The purpose of the issue/hold generator is to take the resource vector and determine if instructions can issue. If an instruction can not issue, it will be held. The resource vector indicates which resources are required by the instructions. If the resource vector indicates that execution unit EX0 is required, but execution unit EX0 is busy, then the group will be held. If the resource vector indicates that execution unit EX1 is required, but execution unit EX1 is busy, then the group will be held. If the thread is secondary and the other thread indicates that execution unit EX0 is required and this thread requires execution unit EX0, then the group is held. The same holds true for execution unit EX1, load port LD0 and load port LD1.

The issue/hold logic generator 314 is output to steering control generator 316. Steering control generator 316 also receives, as an input, the resource vector of the Thread 1 instruction from latch 348. The steering controllers allow a particular instruction to be steered, dynamically, to a particular execution unit. For example, if the resource vector for instruction FP0 of Thread 0 originally had it being directed to FPU0 for execution, a prior art system would require that if be directed to FPU0. If an instruction from Thread 1 had priority access to FPU0, then instruction FP0 of Thread 0 would have to wait until FPU0 became free, even if FPU1 were available. However, using the steering control of the present invention, FP0 of Thread 0 can be redirected or steered to FPU1 if there is reason to do so, such as the conflict described in this example.

Once the steering controllers determine which instructions are going to be given to which execution units, it is a simple matter to control the execution unit mux's 330, 332, 334, and 336 to control the output (Thread 0 or Thread 1) for each of the four instructions. As can be seen, each of the execution unit mux's receives an input from each thread: the FP0 instructions form each thread are directed to mux 330; the FP1 instructions from each thread are directed to mux 332; the LS0 instructions for each thread are directed to mux 334; and the LS1 instructions form each thread are input to mux 336. Then, depending on the value (1 or 0) if the control signals c, d, e, and f, the mux's will output one or the other of the instructions (e.g., a value of 0, 1, 1, 0 for control signals c, d, e, and f would output FP0 from Thread 0, FP1 from Thread 1, LS0 from Thread 1, and LS1 from Thread 0, respectively, if we assume that a 0 control signal activates an output from Thread 0 and a 1 control signal activates an output form Thread 1).

Mux 326 and mux 328 are the steering muxes. The output of the generate steering controls 316 is stored in latch 318. In the following cycle, the output of latch 318 is used to steer instructions from latches 324 to the appropriate execution unit. Mux 326 will either select FP0 instruction or FP1 instruction to send to execution unit 0. Mux 328 will select the instruction not being selected by mux 326 to send to execution unit 1. Inverter 320 ensures that mux 328 is selecting the instruction that mux 326 is not selecting.

Figure 4:
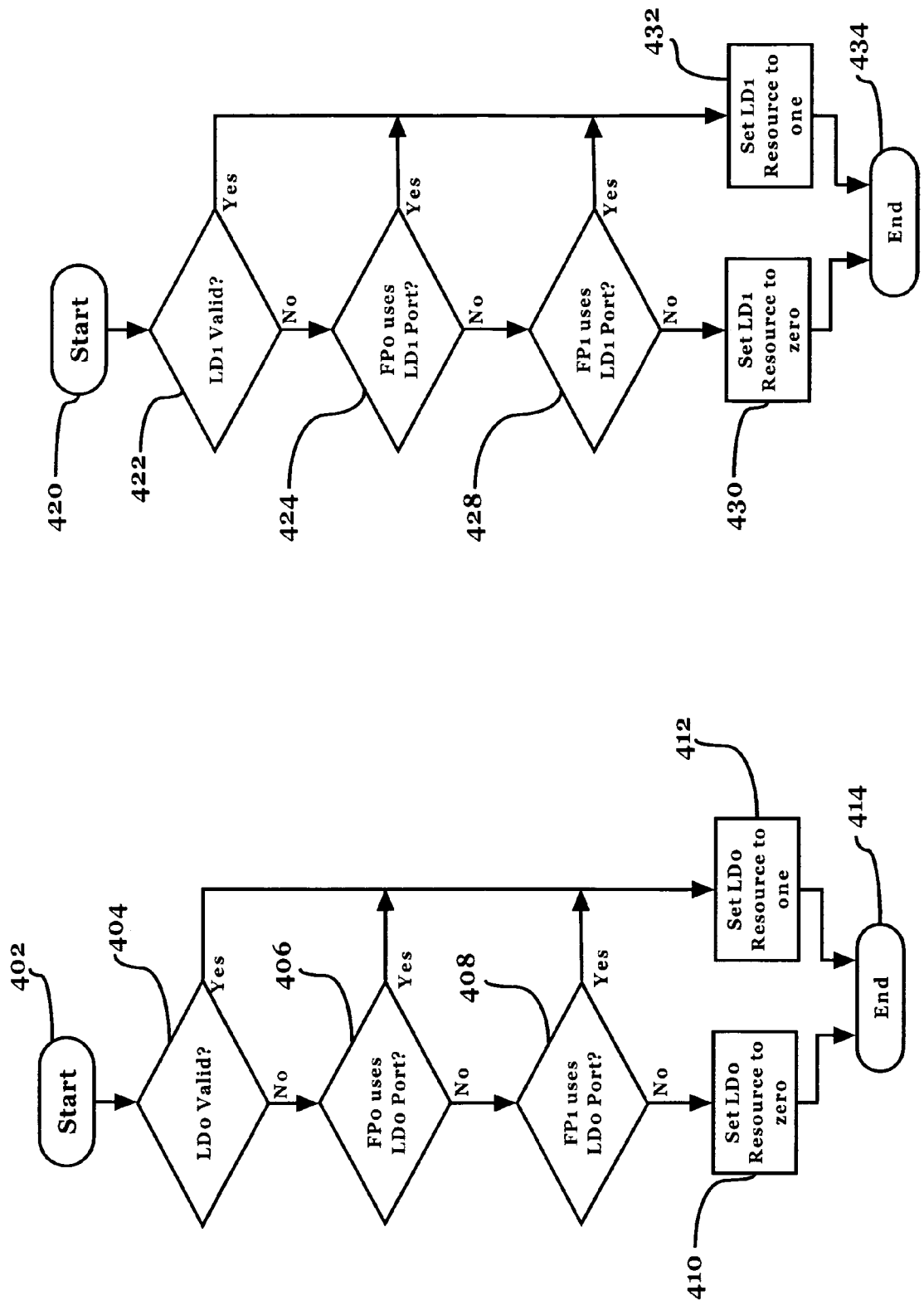
FIG. 4 illustrates the resource bit generation for the LD0 and LD1 resources.
Figure 5:
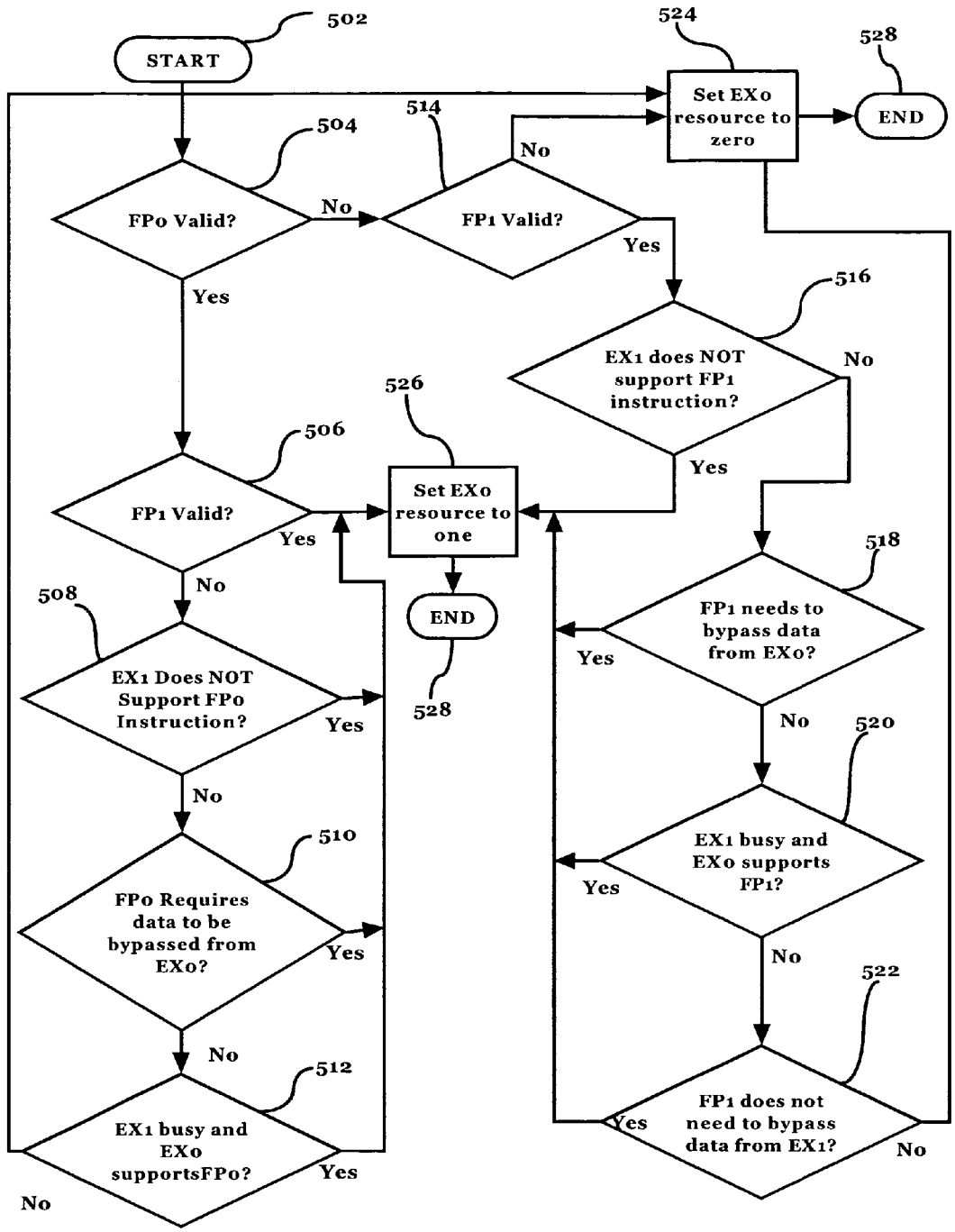
FIG. 5 illustrates how the resource bits are set for the execution units.
Figure 6:
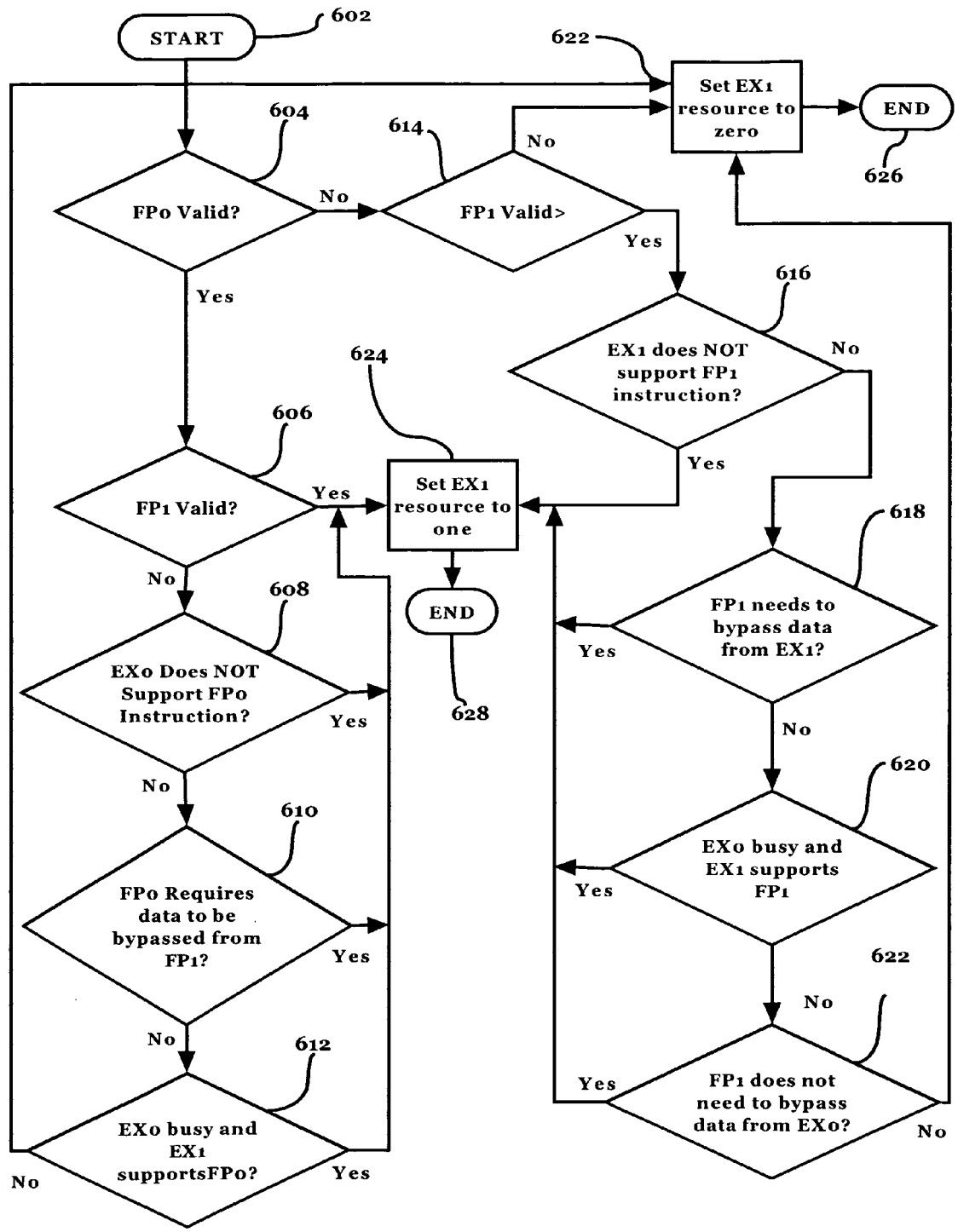
FIG. 6 illustrates the resource bit generation for execution unit EX1.
Figure 7:
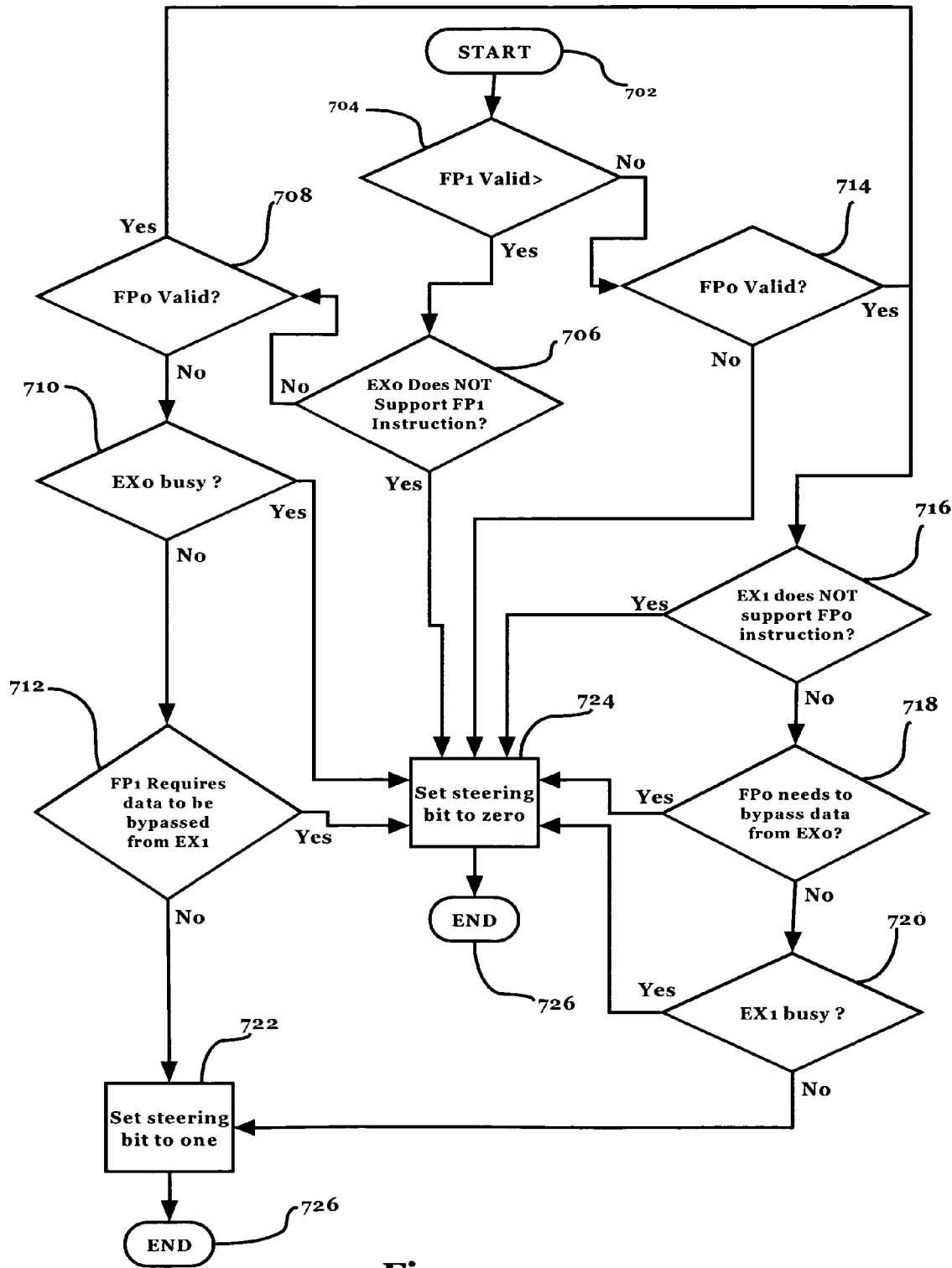
FIG. 7 is a flowchart illustrating the steering bit logic for Thread0.

FIGS. 4 through 7 are flowcharts illustrating how the various resource bits are generated. FIGS. 4,5,6 correspond to the logic in "generate resource vector" box 306 on Thread0 and 346 on Thread1. FIG. 7 corresponds to the generate steering controls (box 316 and 356). Referring first to FIG. 4, FIG. 4 illustrates the resource bit generation for the LD0 and LD1 resources. Referring first to the LD0 resource, the process begins at step 402, and at step 404, a determination is made as to whether or not the LD0 instruction is valid. If the LD0 resource is valid, the process proceeds directly to step 412, were the LD0 resource it is set to "one". This occurs in resource vector generator 306.

If, at step 404, it is determined that instruction LD0 is not valid (i.e., there is no instruction present), the process proceeds to step 406, where a determination is made as to whether or not instruction FP0 can use the LD0 port. If, at step 406, is determined that the FP0 instruction will use the LD0 port, and the process proceeds to step 412, and the LD0 resource bit is set to one.

If, at step 406, is determined that the FP0 instruction will not use the LD0 port, then the process proceeds to step 408, were the same determination is made with respect to the FP1 instruction. If the FP1 instruction will use the LD0 port, then the LD0 resource bit is set to one. If, the LD0 instruction is not valid, and neither of the FP instructions will use the LD0 port, then the LD0 resource bit is set to zero, which by default leaves the LD0 port available for use by the other thread. The process ends at step 416.

The logic for generating the resource bit for execution unit LD1 is essentially identical to that of LD0. Specifically, if, during any of the steps 422, 426, or 428, a "yes" response results from one of the queries, the resource bit for LD1 is set to one. If all responses to queries results in a "no" response, the LD1 resource bit is set to zero.

FIG. 5 illustrates how the resource bits are set for the execution units. The process begins at step 502, and at step 504, a determination is made as to whether or not the FP0 instruction is valid. If it is, a determination is made at step 506 as to whether or not the FP1 instruction is valid. If both are valid, then at step 526, the EX0 resource bit is set to one.

If FP1 is not valid, then at step 508, a determination is made as to whether or not execution unit EX1 supports the FP0 instruction. If it does not support the FP0 instruction, the EX0 resource bit is set to one, and the process ends. If EX1 does support the FP0 instruction, then the process proceeds to step 510, and a determination is made as to whether or not the FP0 instruction requires that data be bypassed from EX0. For example, an instruction in Execution Unit 0 (EX0) may be producing a result that the FP instruction would like to source. The data will be directly sent from the execution unit to the FP instruction, without the FP0 instruction having to read the register file. If yes, this means that there is an older instruction in EX0 and that the FP0 instruction has a data dependency on this particular instruction, and the EX0 resource bit is set to one. If no, then it is determined if EX1 is busy and if EX0 supports instruction FP0. If EX1 is busy and EX0 supports instruction FP0, the EX0 resource bit is set to one. If not, the process proceeds to step 514, where it is next determined if instruction FP1 is valid.

If, at step 514, it is determined that FP1 is not valid, the EX0 resource bit is set to zero, and the process ends. However, if at step 514 it is determined that instruction FP1 is valid, then the process proceeds to step 516 where is determined if EX1 does or does not support the FP1 instruction. If EX1 does not support the FP1 instruction, then the process proceeds to step 526, where the resource is set to one. If, however, at step 516 it is determined that EX1 does support the FP1 instruction, then the process proceeds to steps 518, 520, and 522, where it is determined if instruction FP1 needs to bypass data from execution unit EX0; if execution unit EX1 is busy and execution unit EX0 supports instruction FP1; and if instruction FP1 does or does not need to bypass data from execution unit EX1. If the answer to any of the queries in steps 518, 520, or 522 results in a "yes", the process proceeds to step 526 where the resource bit for execution unit EX0 is set to one. If the response to all three queries is "no", then the process proceeds to step 524, where the resource bit for execution unit EX0 is set to zero. The process then ends.

FIG. 6 illustrates the resource bit generation for execution unit EX1. It is essentially identical in concept to the flowchart of FIG. 5, and the logic flow is directed towards the resource bit of EX1 instead of EX0. Thus, for example, at step 604 it is determined if instruction FP0 is valid, and if it is, at step 606 is determined if instruction FP1 is valid. If both are valid, the resource bit for EX1 is set to one. If the FP1 instruction is not valid, then at step 608 it is determined if execution unit EX1 does or does not support the FP0 instruction. If it does not support the FP0 instruction, the FP1 resource is set to one. If it does support the FP0 instruction, the process proceeds to step 610, where it is determined if instruction FP0 requires data to be bypassed from execution unit EX1. If it does, the process proceeds to step 624, where the FP1 resource bit is set to one. If it does not, the process proceeds to step 612, where it is determined if execution unit FP0 is busy and if execution unit EX1 supports instruction FP0. If it does, execution unit EX1's resource bit is set to one. If it does not, the process proceeds to step 614, where a determination is made as to whether or not instruction FP1 is valid.

If instruction FP1 is not valid, the resource bit for execution unit EX1 is set to zero. If the FP1 instruction is valid, then at step 616, it is determined if execution unit EX0 does or does not support the FP1 instruction. If execution unit EX0 does not support the FP1 instruction, then the resource bit for execution unit EX1 is set to one. If it is determined at step 616 that execution unit EX0 does support the FP1 instruction, the process proceeds to step 618, where it is determined if instruction FP1 needs to bypass data from execution unit EX1. If it does, then the resource bit for execution unit EX1 is set to one. If it does not, the process proceeds is up 620, where it is determined if execution unit EX0 is busy and if execution unit EX1 supports instruction FP1. If the answer is in the affirmative, execution unit EX1 has its resource bit set to one. If the answer is in the negative, then execution unit EX1 has its resource bit set to zero.

FIG. 7 is a flowchart illustrating the steering bit logic for Thread zero. This is the process by which it is determined to which execution unit the instruction will be steered. If a steering bit is set to zero, this means that instruction FP0 will be steered to execution unit EX0, and instruction FP1 will be steered to execution unit EX1. If the steering bit is set to one, this means that instruction FP0 will be steered to execution unit EX1, and instruction FP1 will be steered to execution unit EX0.

Referring to FIG. 7, at step 704, it is determined whether or not the FP1 instruction is valid. If it is valid, and the process proceeds to step 706, where it is determined if execution unit EX0 does or does not support the FP1 instruction. If the execution unit EX0 does not support the FP1 instruction, then the steering bit of the thread is set to zero. If the execution unit EX0 does support the FP1 instruction, it is next determined at step 708 if instruction FP0 is valid. If instruction FP0 is not valid, it is next determined at step 710 if execution unit EX0 is busy. If it is busy, the steering bit for the thread is set to zero. If it is not busy, then the process proceeds to step 712.

At step 712, a determination is made as to whether or not the instruction FP1 requires data to be bypassed from execution unit EX1. If it does, the steering bit for the thread is set to zero. If it does not, steering bit for the thread is set to one.

Moving back to step 708, if it is determined that the FP0 instruction is valid, the process proceeds to step 716 where it is determined whether or not the execution unit EX1 does or does not support the FP0 instruction. If the execution unit EX1 does not support the FP0 instruction, and the steering bit for the thread is set to zero. However, if the execution unit EX1 doesn't support the FP0 instruction, then at step 718, it is determined whether or not instruction FP0 needs to bypass data from execution unit EX0. If it does, the steering bit is set to zero for the thread. If it does not, then at step 720, it is determined whether or not execution unit EX1 is busy. If at step 720, it is determined that execution unit EX1 is busy, then the steering bit is set to zero for the thread. If it is not busy, then the steering bit is set to one for the thread.

The present invention allows instructions to be dynamically steered to an execution unit. Because instructions from both threads are dynamically steered, a mechanism needs to prevent the secondary (non-primary) thread from colliding with the primary thread. This invention addresses this problem. This invention also allows us to easily regenerate new steering controls in cases where an instruction needs a particular execution unit or a particular execution unit is busy.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage in the processor itself. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-2 support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of redirecting instructions of a plurality of threads in a processor, comprising:
    identifying a statically-assigned execution unit assignment for each instruction;
    issuing said instructions to a floating point issue queue;
    analyzing the execution unit assignment for the issued instructions in each thread;
    determining if the statically assigned execution unit assignments can be optimized by changing the statically assigned assignments; and
    dynamically steering any of said issued instructions whose execution unit assignments can be optimized to new execution unit assignments that achieve optimization of said processor.

2. The method of claim 1, wherein said dynamic steering is performed using said floating point issue queue.

3. The method of claim 2, wherein:
    said analyzing step comprises the analysis of resource vector bits for each instruction; and
    said floating point issue queue dynamically recalculates and modifies the resource vector bits to steer the instructions to execution units so as to achieve said optimization.

4. The method of claim 3, wherein said optimization is achieved by steering dependent instructions to the same execution unit as that of an instruction from which the dependent instruction depends.

5. The method of claim 3, wherein said optimization is achieved by steering instructions around execution units that are busy.

6. The method of claim 3, wherein said processor comprises an SMT processor.

* * * * *